United States Patent [19]

Hallgren

[11] Patent Number: 5,284,313
[45] Date of Patent: Feb. 8, 1994

[54] MOUNTING SYSTEM

[75] Inventor: Leander Hallgren, St. Paul, Minn.

[73] Assignee: AbleNet, Inc., Minneapolis, Minn.

[21] Appl. No.: 894,987

[22] Filed: Jun. 8, 1992

Related U.S. Application Data

[63] Continuation-in-part of Ser. No. 818,177, Jan. 8, 1992.

[51] Int. Cl.$^5$ ............................................. F16M 13/00
[52] U.S. Cl. ..................... 248/279; 248/288.5; 403/90
[58] Field of Search ............... 248/279, 276, 288.5, 248/288.3, 285, 286, 122; 403/90

[56] References Cited

U.S. PATENT DOCUMENTS

| | | | |
|---|---|---|---|
| 1,059,217 | 4/1913 | Rudy | 248/279 |
| 1,220,266 | 3/1917 | Ott | 248/276 |
| 1,503,638 | 8/1924 | Cooper | 248/276 |
| 2,238,870 | 4/1941 | Haynes | 403/76 X |
| 2,346,346 | 4/1944 | Anderson | 403/76 X |
| 2,711,872 | 6/1955 | Lampke | 248/276 |
| 4,708,510 | 11/1987 | McConnell et al. | 403/90 |

FOREIGN PATENT DOCUMENTS

693517  9/1964  Canada ................ 248/279

*Primary Examiner*—Alvin C. Chin-Shue
*Attorney, Agent, or Firm*—Merchant, Gould, Smith, Edell, Welter & Schmidt

[57] ABSTRACT

An adjustable mounting system for holding a device in a particular position. The system comprises support apparatus having a base member for coupling the system to a rigid support structure. The system also comprises an expandable arm having adjustment apparatus for adjusting the length of the expandable arm anywhere between fully extended and fully shortened positions. The expandable arm has first and second ends. The first end of the expandable arm comprises mounting apparatus for mounting the arm to the support apparatus. The second end of the expandable arm comprises securing apparatus for securing the device to be held in a particular position proximate the second end of the expandable arm. The present system also comprises lockable positioning apparatus coupled between the first end of the expandable arm and the support apparatus for positioning and locking the arm so that the device can be held proximate the first end of the arm anywhere within first and second hemispheres. The first hemisphere is defined by the length of the expandable arm when the arm is fully extended, and the second hemisphere is defined by the length of the expandable arm when the arm is fully shortened.

24 Claims, 8 Drawing Sheets

MOUNTING SYSTEM

This application is a continuation-in-part application Ser. No. 07/818,177, filed Jan. 8, 1992.

BACKGROUND OF THE INVENTION

The present invention is an adjustable mounting system for holding a device in a particular position. The present invention was developed to facilitate the needs of physically-handicapped individuals who often need to have activating switches put in varying particular locations for access by the individuals in varying circumstances and from varying parts of their bodies. Since these individuals often have severely restricted ability to move their hands or other parts of their bodies in order to make contact with an activating switch, a system which is highly versatile and which permits the positioning of switches or other devices was needed. However, in addition to serving the needs of individuals who are handicapped or who otherwise have limited abilities to come into contact with devices that may be held by the present system, the system is also widely useful for many other holding applications, for example, for holding a camera in virtually any position desired.

SUMMARY OF THE INVENTION

The present invention is an adjustable mounting system for holding a device in a particular position. The system comprises support apparatus having a base member for coupling the system to a rigid support structure. The system also comprises an expandable arm having adjustment apparatus for adjusting the length of the expandable arm anywhere between fully extended and fully shortened positions. The expandable arm has first and second ends. The first end of the expandable arm comprises mounting apparatus for mounting the arm to the support apparatus. The second end of the expandable arm comprises securing apparatus for securing the device to be held in a particular position proximate the second end of the expandable arm. The present system also comprises lockable positioning apparatus coupled between the first end of the expandable arm and the support apparatus for positioning and locking the arm so that the device can be held proximate the first end of the arm anywhere within first and second hemispheres. The first hemisphere is defined by the length of the expandable arm when the arm is fully extended, and the second hemisphere is defined by the length of the expandable arm when the arm is fully shortened.

DETAILED DESCRIPTION OF THE PREFERRED EMBODIMENTS

The present invention is an adjustable mounting system for holding a device (not shown) in a particular position. The first preferred embodiment is illustrated in FIGS. 1-8. The system of the first preferred embodiment comprises support apparatus comprising a base member 14 for coupling the system to a rigid support structure (not shown) such as a table or chair.

The present system further comprises an expandable arm 12 comprising adjustment hardware for adjusting the length of the expandable arm anywhere between fully extended and fully shortened positions. The expandable arm comprises a first end 46 and a second end 48. First end 46 of expandable arm 12 is coupled to mounting apparatus 50 (FIG. 7) for mounting arm 12 to the support means. In the embodiment shown, mounting apparatus 50 comprises an adapter 51 having a cylindrical protrusion which fits into a hollow portion defined by a preferred embodiment of expandable arm 12. A set screw 55 (FIG. 3) may be used to hold expandable arm 12 onto protrusion 53. Adapter 51 may either be a separate piece secured to housing 64 or may be formed integrally with housing 64. Second end 48 of expandable arm 12 comprises securing apparatus 52 for securing the device to be held proximate the second end of expandable arm 12.

Figure 1:
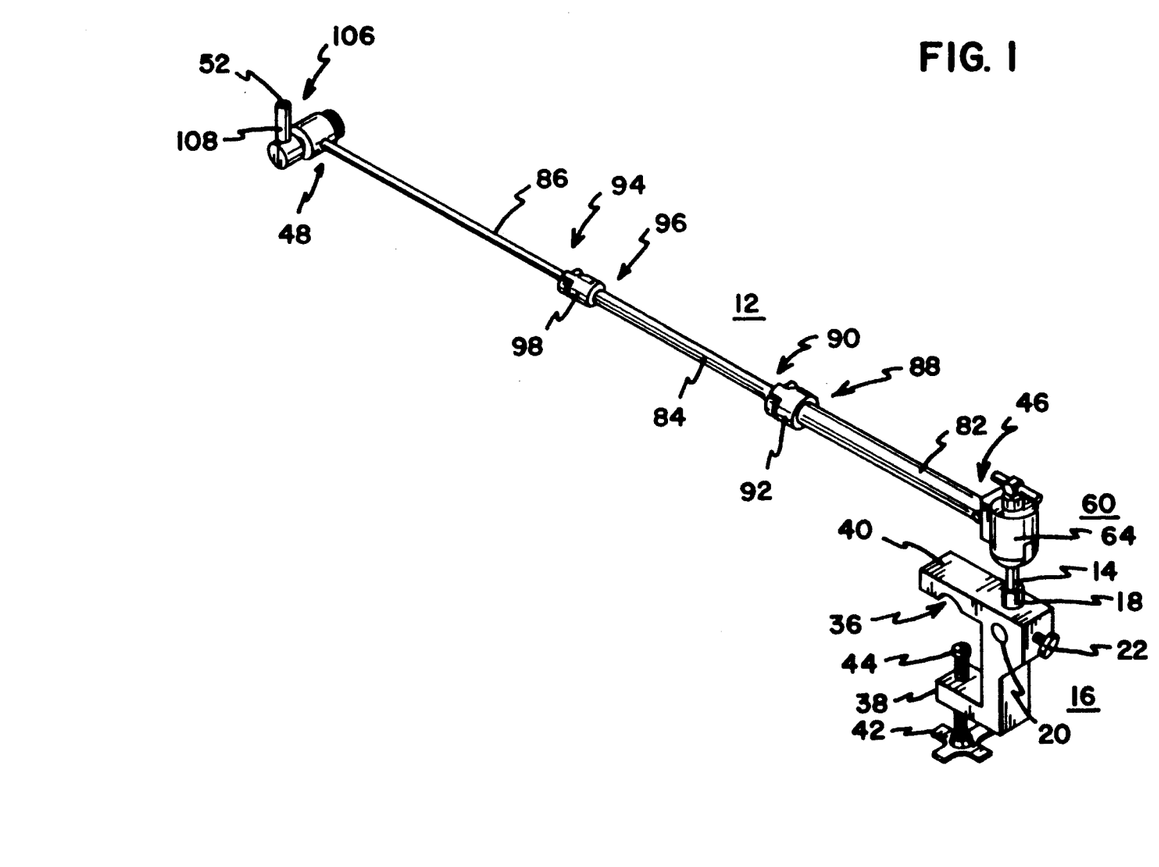
FIG. 1 illustrates a first preferred embodiment of the present system.
Figure 2:
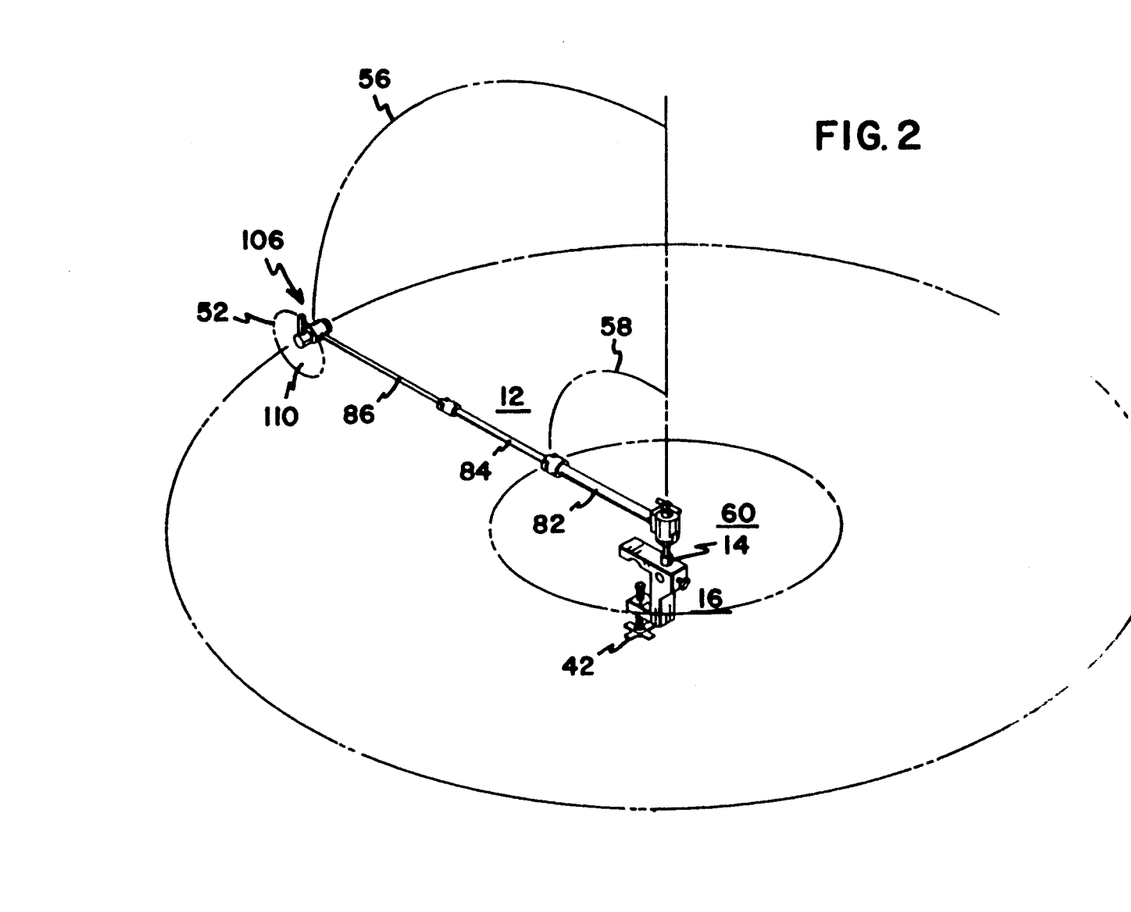
FIG. 2 illustrates the first and second hemispheres in which devices may be held in particular positions by the present system.

The system also comprises lockable positioning apparatus 54 coupled between first end 46 of expandable arm 12 and base member 14 for positioning and locking arm 12 so that the device can be held proximate first end 48 of arm 12 anywhere within first and second hemispheres 56 and 58 (see FIG. 2). First hemisphere 56 is defined by the length of expandable arm 12 when the arm is fully extended, and second hemisphere 58 is defined by the length of expandable arm 12 when the arm is fully shortened.

Figures 7, 8, 9, 10:
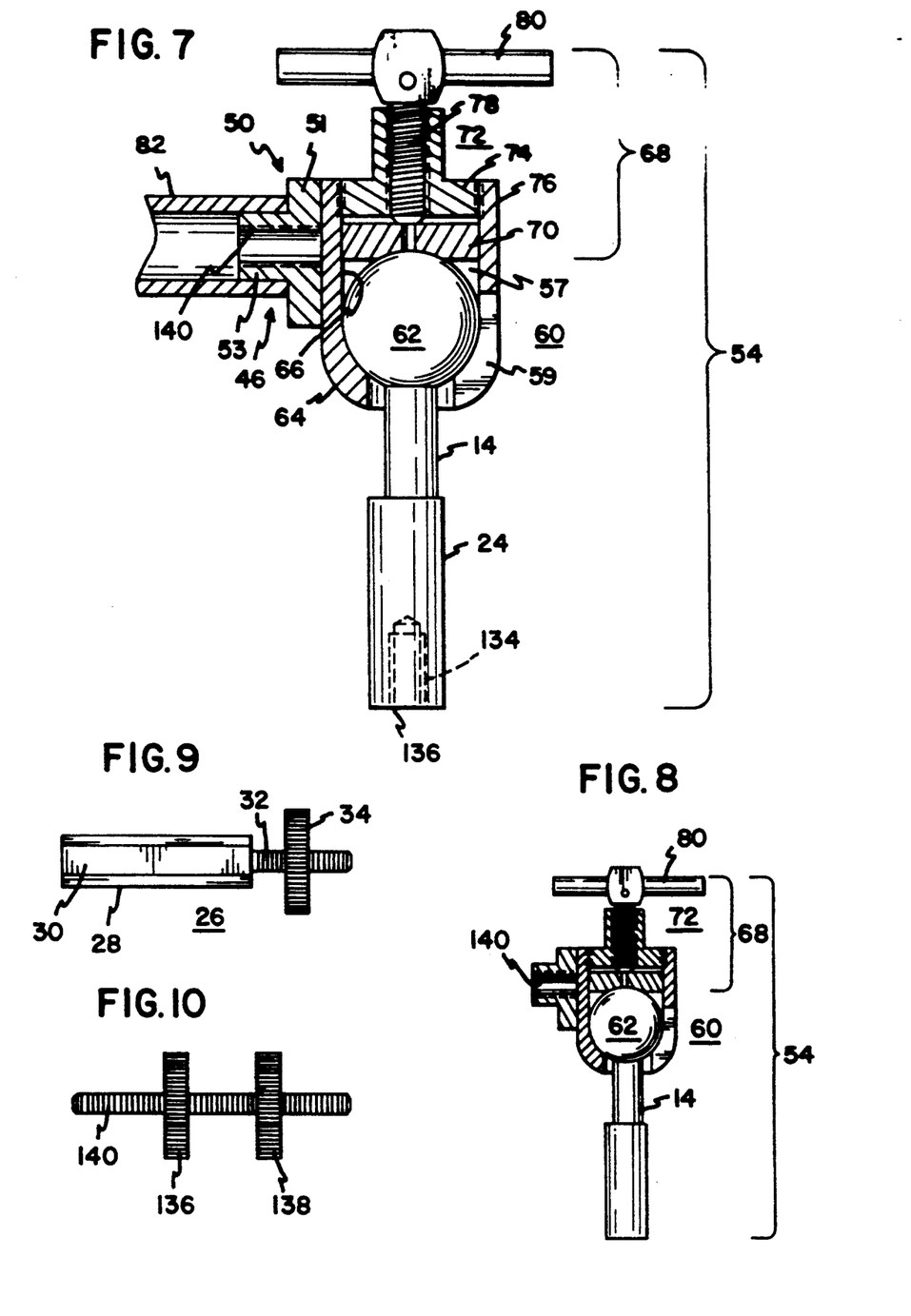
FIG. 7 illustrates a preferred locking ball joint compatible with the present system.
FIG. 8 illustrates an embodiment of a mounting system without the expandable arm.
FIGS. 9 and 10 illustrate optional mounting hardware which can be used in conjunction with the mounting system shown in FIG. 8 as well as the expandable arm mounting system shown in the other Figures.

In the first preferred embodiment, lockable positioning apparatus 54 comprises a lockable ball joint 60. The preferred embodiment of lockable ball joint 60 is shown in cross section in FIG. 7. FIG. 7 illustrates a ball portion comprising a substantially spherical ball 62, ball 62 being rigidly secured to base member 14. Lockable ball joint 60 is further shown to comprise a ball joint housing 64 formed as part of support means 54. Ball joint housing 64 defines a cavity 57 bounded in part by an inner housing wall 66 having a slidable slip fit over ball 62. The ball joint housing is shown configured around at least a portion of ball 62 and at least part of base member 14 so that it may be positioned to any radial orientation within the first and second hemispheres. Similarly in this regard, as can be seen in FIG. 2, if a central axis were drawn along the length of expandable arm 12, such a central axis can also be oriented and positioned in any radial orientation within first and second hemispheres 56 and 58.

In the first preferred embodiment shown, lockable ball joint 64 comprises a slot 59 which opens to cavity 57 and which permits housing 64 to rotate through base member 14 in order to provide the freedom of movement previously described.

Lockable ball joint 60 further comprises locking hardware 68 for locking ball joint housing 64 into any orientation to which the ball joint housing can be positioned.

Locking hardware 68 may comprise a clutch plate 70 within housing 64 and adjustment apparatus 72 for adjustably positioning clutch plate 70 so that it can be selectively biased into or away from ball 62.

Cavity 57 defined by housing 64 may be configured so that it comprises a closable opening at one surface of the housing, the closable opening typically being of sufficient size so that ball 62 and clutch plate 70 can be positioned within the housing cavity through the opening. In such an instance, housing 64 typically comprises a cover 74 which can be removably fitted into the opening, threads 76 serving a convenient means for this purpose. In the embodiment shown, the adjustment apparatus 72 comprises an adjustment member 78 which passes through cover 74 and abuts clutch plate 70 for adjusting the bias of clutch plate 70 into or away from ball 62. Preferably, adjustment member 78 comprises a threaded portion which cooperates with a threaded portion of cover 74 so that the bias of clutch plate 70 into or away from ball 62 can be selected by adjusting the rotational position of adjustment member 78, typically by using a handle or lever 80 attached to threaded adjustment member 78.

In the first preferred embodiment, expandable arm 12 comprises first, second and third interlocking members 82, 84 and 86 respectively. The first and second interlocking members 82 and 84 preferably comprise first and second interlocking tubes 82 and 84, the second and third interlocking members 84 and 86 respectively each comprising and outside diameter.

First interlocking tube 82 has an inside diameter which forms a slidable slip fit with the outside diameter of second interlocking tube 84. The first end 90 of second interlocking tube 84 is positioned and slides axially and rotatably into the second end 88 of first interlocking tube 82. As previously indicated, first end 46 of first interlocking tube 82 may comprise mounting means 50 (FIG. 7) for mounting expandable arm 12 to support member 54.

The second end 88 of the first interlocking tube comprises first tube locking hardware 92 for locking the second tube 84 at any desired axial and rotational position within first tube 82. Second interlocking tube 84 has an inside diameter which forms a slidable slip fit with the outside diameter of third interlocking member 86.

Figure 3:
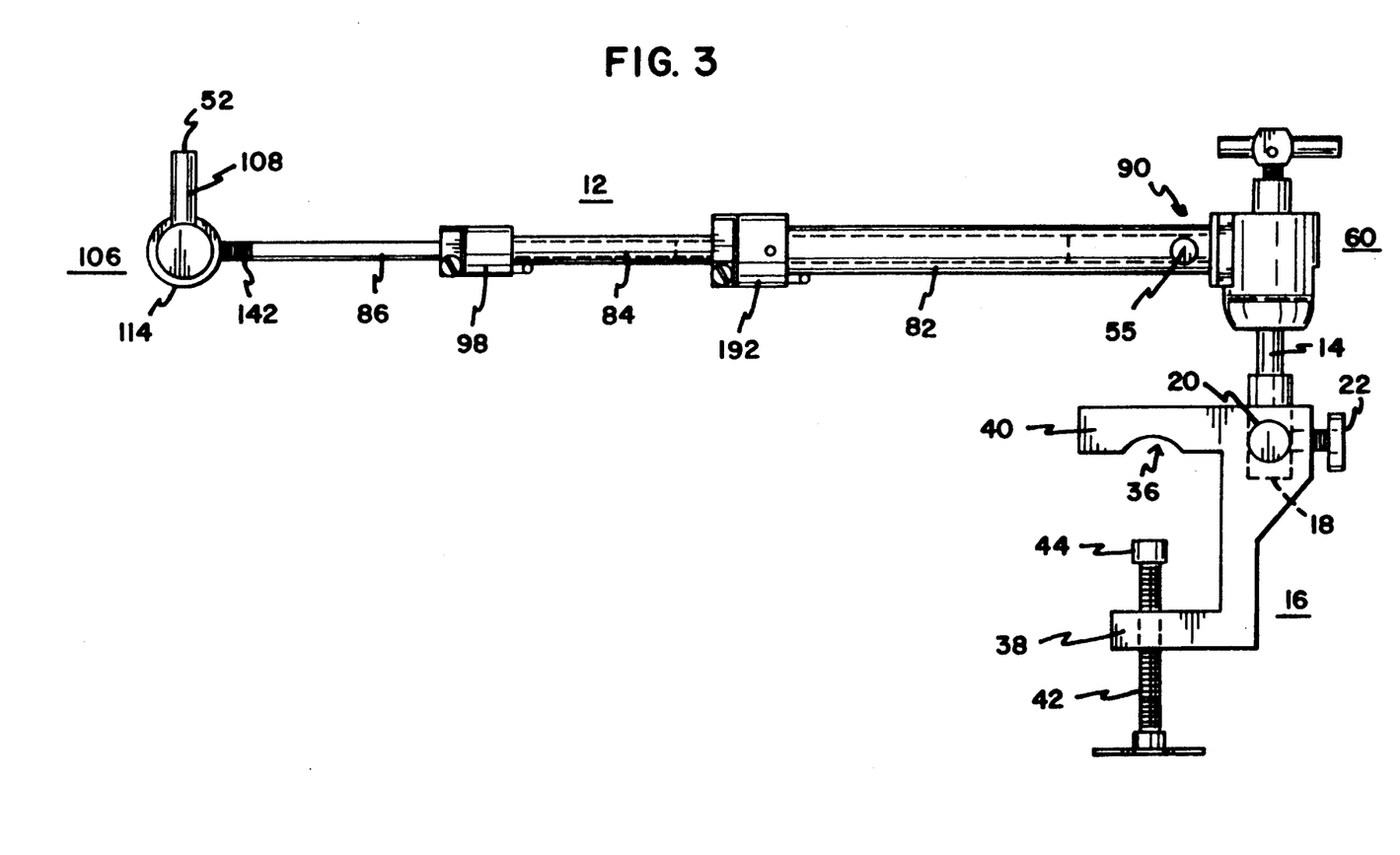
FIG. 3 is an elevational view of the embodiment of FIG. 1.
Figure 4:
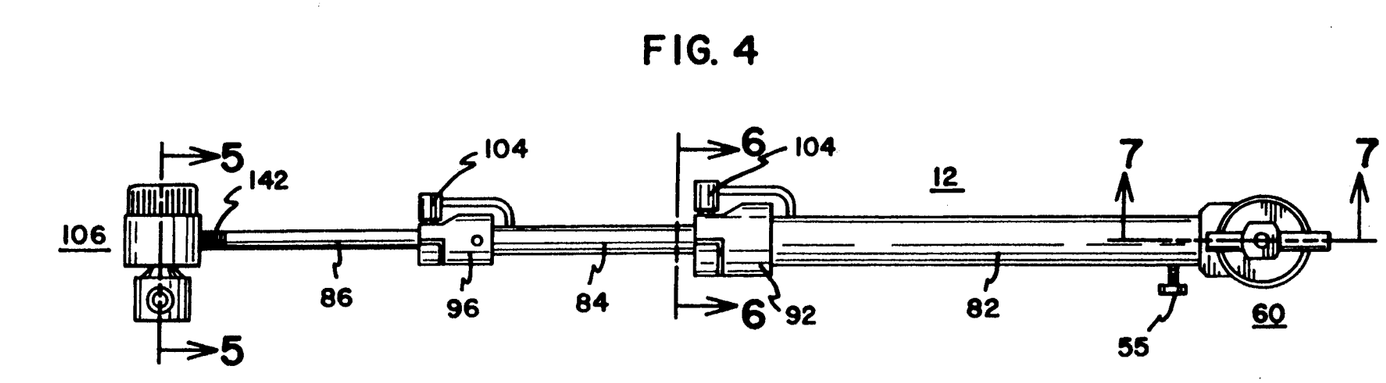
FIG. 4 is a top view of the embodiment of FIG. 1.

The first end 94 of third interlocking member 86 is positioned and slides axially and rotatably into second end 96 of second interlocking tube 84, second end 96 of second interlocking tube 84 comprising second tube locking hardware 98 for locking third interlocking member 86 at any desired axial or rotational position within second tube 84. In FIGS. 3 and 4 second and third interlocking members 84 and 86 are shown partially positioned into interlocking members 82 and 84, respectively, by comparison to the positions of these interlocking members in FIGS. 1 and 2.

In the first preferred embodiment, the second end 48 of third interlocking member 86 is coupled via swing joint hardware 106 to securing means 52 which secures the device to be held proximate the second end 48 of expandable arm 12.

Figure 6:
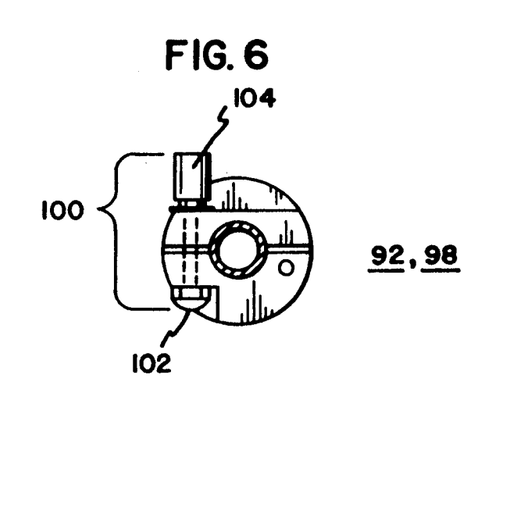
FIG. 6 illustrates a preferred split ring for use in connection with adjusting the expandable arm.

As shown in the Figures, first and second tube interlocking hardware sets 92 and 98 may each comprise a split ring 92 and 98 located respectively at the second end of the first and second interlocking tubes. First split ring 92 typically comprises a nominal internal diameter surrounding the outside diameter of second interlocking tube 84, and second split ring 98 typically comprises a nominal internal diameter surrounding the outside diameter of third interlocking member 86. Each split ring 92 and 98 typically further comprise adjustment hardware 100 for adjusting its internal diameter in order to adjustably bias the internal diameter of the split rings around the corresponding outside diameter of the second and third interlocking members. In the embodiment shown, adjusting hardware 100 comprises a simple bolt 102 passing through the split rings with a threaded adjustment handle 104 providing the mechanism for adjusting the internal diameter of each ring.

For securing the device proximate the first end 48 of expandable arm 12, in the embodiment shown comprises a locking swing joint 106 which preferably has 360° of freedom and which preferably can be locked in any position to which it can be orientated.

Preferred locking swing joint 106 comprises an elongated mounting member 108 that swings 360° in a plane 110 (see FIG. 2) that is parallel to the length of expandable arm 12. Elongated mounting member 108 preferably defines a tapped hole 110 (see FIG. 5) in an outer end 112 to serve as an attachment means for securing the device to be held proximate the second end 48 of expandable arm 12.

Figure 5:
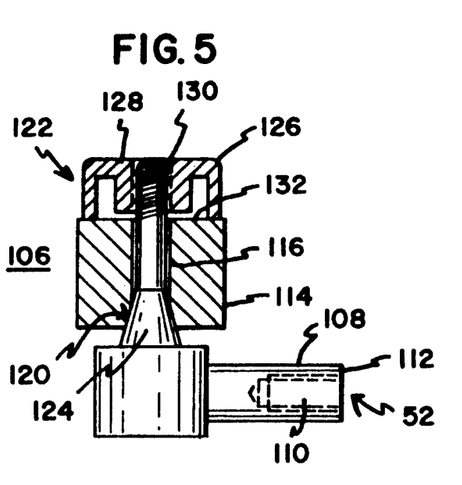
FIG. 5 is a cross-sectional view of a preferred securing apparatus for securing the device to be held proximate the second end of the expandable arm.

Locking swing joint 106 preferably comprises a swing joint housing 114 having a central longitudinal axis oriented in a plane which is substantially perpendicular to the length of expandable arm 12, the preferred swing joint housing defining a longitudinal cavity 116 oriented along at least a portion of its central longitudinal axis. In the preferred design, the 360° of freedom of swing joint 106 is enabled by a rod-shaped member 118 that fits within longitudinal cavity 116.

In preferred swing joint 106, longitudinal cavity 116 defined by swing joint housing 114, as well as rod-shaped member 118 that fits into longitudinal cavity 116, each comprise a portion having a matching tapered configuration 120. In this embodiment, lockable swing joint 106 further comprises swing joint locking apparatus 122 for pulling the tapered portion 124 of rod-shaped member 118 into the tapered portion of the longitudinal cavity. Swing joint locking apparatus 122 may comprise a threaded portion 126 on rod-shaped member 118 which cooperates with swing joint housing 114 in order to pull tapered portion 114 of rod-shaped member 118 into the tapered portion of longitudinal cavity 116, thus locking the rotational position of swing joint 106.

In the preferred embodiment, the longitudinal cavity 116 defined by swing joint housing 114 passes through the entire length of housing 114. In addition, threaded portion 126 of rod-shaped member 118 extends out one end of swing joint housing 114. In this embodiment, a knob 128 defining a central female thread 130 is attached to threaded portion 126 of rod-shaped member 118 and is adjustable along the threaded length of rod-shaped member 118 so that it can be adjustably biased against one end 132 of swing joint housing 114 so that swing joint 106 can be locked into position.

Accordingly, as previously indicated, the purpose of the unique combination of elements in the present adjustable mounting system is to permit the adjustment and placement of a switch or other device anywhere within a hemisphere 56 defined by the length of expandable arm 12 when interlocking members 82, 84 and 86 are fully extended and outside of hemisphere 58 when interlocking members 82, 84 and 86 are fully shortened. It will be recognized by those skilled in the art that other variations of expandable arm 12 may exist, including, for example, expandable arms having only two interlocking members or expandable arms having more than three interlocking members. Other types of locking hardware can also be used to securely establish the desire length of arm 12.

By way of dimensional examples, the present system in its preferred form has an expandable arm 12 having a length on the order of 20 inches when fully expanded. The nominal outside diameter of third interlocking tube 86 is 0.25 inch (6.35 mm). Those skilled in the art will recognize that many different nominal dimensions characterizing the present invention may be used.

With the present system, the position of the switch, camera, or other device being held by the system can be locked into place anywhere between first and second hemispheres 56 and 58 by the use of lockable ball joint 60, lower and upper interlocking member locks 92 and 98 and locking top swing joint 106. Securing hardware 52 typically holds the switch or other device to be held in position via threaded aperture 110 defined by elongated mounting member 108. The extension members allow for movement along the length of expandable arm 12 and top swing joint 106, along with the rotation of extension members 82, 84 or 86, permit total movement of securing apparatus 52 within hemispheres 56 and 58. Thus, after placement of the device to be held in the required position, the four joints just mentioned are locked, and the device will be held in a rigid position, provided that base member 14 is securely attached to a rigid structure.

In this regard, base member 14 may be coupled, by way of example, to a supporting clamp 16, which may have a "C clamp" configuration. As is shown in the drawings, supporting clamp 16 may define orthogonally oriented apertures 18 and 20 adapted for receiving the configuration of base member 14 for holding base member 14 in either of two mutually-orthogonal positions. Supporting clamp 16 is shown with a set screw 22 which may be used to secure base member 14 into supporting clamp 16 in either aperture 18 or 20. Base member 14 may optionally comprise a flat surface 24 (see FIGS. 7 and 8) for interfacing with the biasing end of set screw 22.

The present mounting system may also include an optional post mounting adapter 26 (FIG. 9). Post mounting adapter 26 is shown comprising a post 28 having a flat side 30, with post 28 being sized for insertion in either of the two mutually-perpendicular apertures 18 and 20 in supporting clamp 16. Mounting post 26 is also shown to include a threaded pin 32 secured to one end of post 30 together with locking nut 34. Post mounting adapter 26 can be used to mount switches, cameras or other devices essentially directly to supporting clamp 16 by placing post mounting adapter 26 directly in either mounting aperture 18 or 20.

The upper clamping surface of supporting clamp 16 may comprise a channel 36 shaped for interfacing with stock of particular diameter, such as one-inch (25.4 mm) stock commonly used by wheelchair manufacturers.

Lower member 38 of supporting clamp 16 is typically shorter than top member 40 of supporting clamp 16 for ease of clamping to tables or the like which have a small overhang.

Supporting clamp 16 may comprise a threaded shaft and handle 42 not unlike those found on typical C clamps. The biasing end 44 of shaft and handle 42 may comprise a nylon shoe which prevents marring and which tilts back and forth a small amount such as 10 degrees for versatility in clamping uneven surfaces or the like.

In the preferred embodiment, base member 14 preferably defines a threaded aperture 134 formed in its lower end 136, threaded aperture 134 preferably comprising a thread such as $\frac{1}{4} \times 20$ inch typically used in the top mounting stud of camera tripods and the like, thus enabling base member 14 and the adjustable mounting system to be easily mounted on top of a wide variety of tripods available in the camera and other industries. Thus, by combining the present mounting system with such tripods, the present system can be securely mounted on many surfaces and locations which would not be otherwise be practical for use in connection with supporting clamps such as 16.

Many different types of mounting apparatus can be made compatible with securing hardware 52 located proximate the first end of expandable arm 12. As previously indicated, many devices can be secured to elongated mounting member 108 via tapped hole 110 which, for example, may be configured in a $\frac{1}{4} \times 20$ inch or other commonly used thread. Among the many types of adapters that can readily be used with tapped hole 110 in elongated mounting member 108 is the attachment hardware shown in FIG. 10, which shows two locking nuts 136 and 138 located on a threaded rod 140 having a typical thread such as $\frac{1}{4} \times 20$ inch, which allows a camera and many other types of equipment to be secured to the present system in order to be held in any desired position.

Although lockable ball joint 60 will typically be used in combination with expandable arm 12, expandable arm 12 is preferably configured so that first end 46 of first interlocking tube 82 may be removed from mounting hardware 50, which also preferably defines an internal thread 140 which, can be used to mount devices directly to lockable ball joint 60 when the use of expandable arm 12 is not necessary or desired. A typical thread size for internal thread 140 is $\frac{1}{4} \times 20$ inch. Similarly, lockable swing joint 106, which in the preferred embodiment is coupled to the second end 48 of third interlocking member 86 via a $\frac{1}{4} \times 20$ thread 142, can be mounted substantially directly to securing apparatus 50 via threaded aperture 140 and coupling hardware such as threaded rod 140 and locking nuts 136 and 138.

Figure 11:
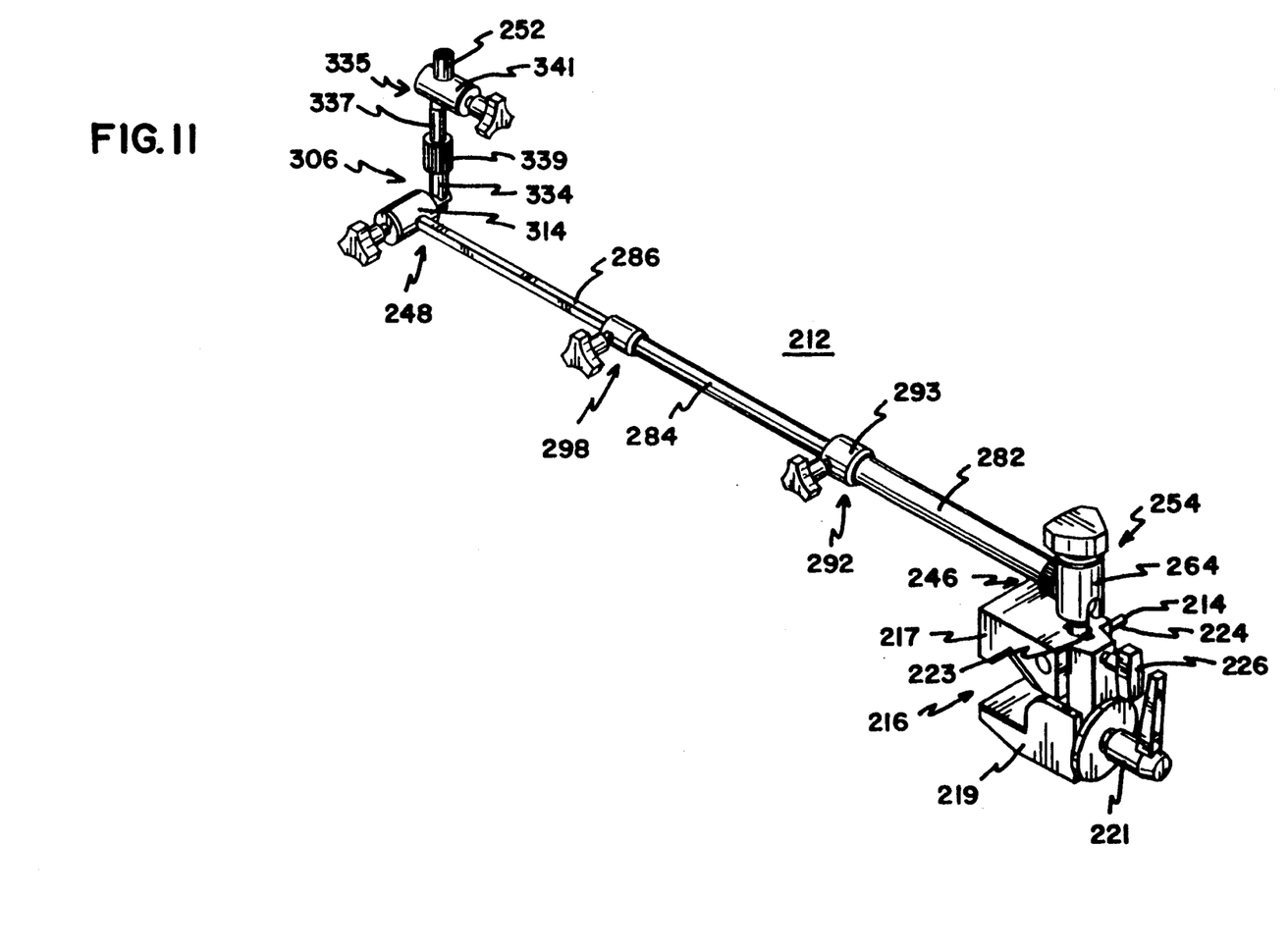
FIG. 11 is a perspective view of a second preferred embodiment of the present system.

The second preferred embodiment of the invention is shown in FIG. 11. This embodiment, like the first embodiment, comprises a base member 214, an expandable arm 212, and a securing apparatus 252. These elements are described in detail with reference to the first embodiment and so will not be repeated here. The primary differences between the first and second preferred embodiments is the structure of the mounting apparatus 250, the lockable positioning apparatus 254, the locking hardware 292 and 298, and the swing joint 306. The system of the second preferred embodiment also employs a second lockable positioning apparatus 335 between the swing joint and the securing apparatus.

Figure 12:
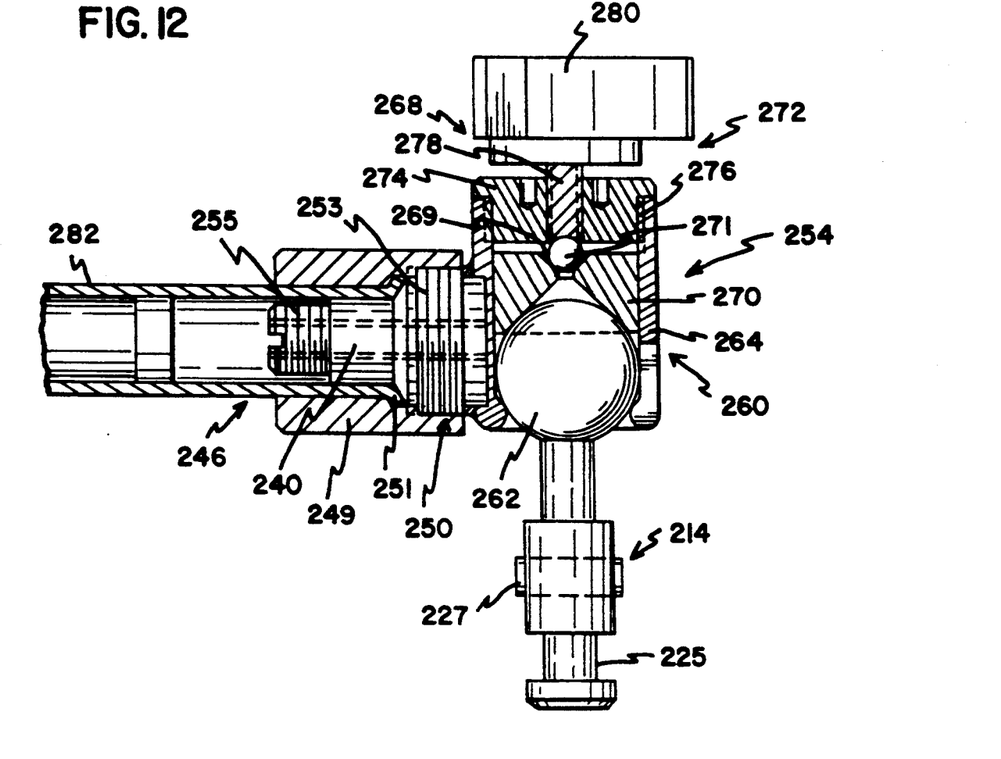
FIG. 12 is a cross-sectional view of the preferred locking ball joint and mounting apparatus of the second embodiment.

The lockable positioning apparatus 254 is shown in greater detail in FIG. 12 and preferably comprises a lockable ball joint 260. The ball joint has a ball 262 rigidly attached to base member 214 and fitted within ball joint housing 264. Locking hardware 268 holds the housing 264 at any desired position relative to the ball.

The locking hardware 268 preferably includes a clutch plate 270 and adjustment apparatus 272. The clutch plate has a rounded lower face of generally the same radius as the ball. The upper face is generally planar and preferably has a rounded depression 269 formed therein.

A cover 274 is connected to the housing 264, preferably by threads 276. The adjustment apparatus preferably includes an adjustment member 278 and a ball bearing 271. The ball bearing rests in depression 269. The adjustment member is threadably disposed through the cover 274. A handle 280 is attached to the adjustment member 278.

According to this arrangement, rotation of the handle adjusts the pressure applied by clutch plate 270 against ball 262. Thus, the housing 264 can be placed in any desired position relative to the base member, and then locked in place by rotating the handle.

The mounting apparatus 250 of the second preferred embodiment is also shown in FIG. 12. The mounting apparatus is preferably formed integrally with the housing 264. The mounting apparatus includes a first fitting 253 having external threads formed thereon. The first end 246 of the expandable arm has a rotatable collar 249 with internal threads. A flange 251 retains the collar on the end of the expandable arm. The arm is connected to the mounting apparatus by threading the collar onto the first fitting 253. The collar preferably has a knurled outer surface so that the collar can be easily operated by hand. The mounting apparatus also comprises a second fitting 255, which is of lesser diameter than the first fitting. The second fitting also has threads on the outer portion thereof. This fitting is used for an alternative configuration which will be described in greater detail later. A threaded aperture 240 extends within the two fittings.

Figure 13:
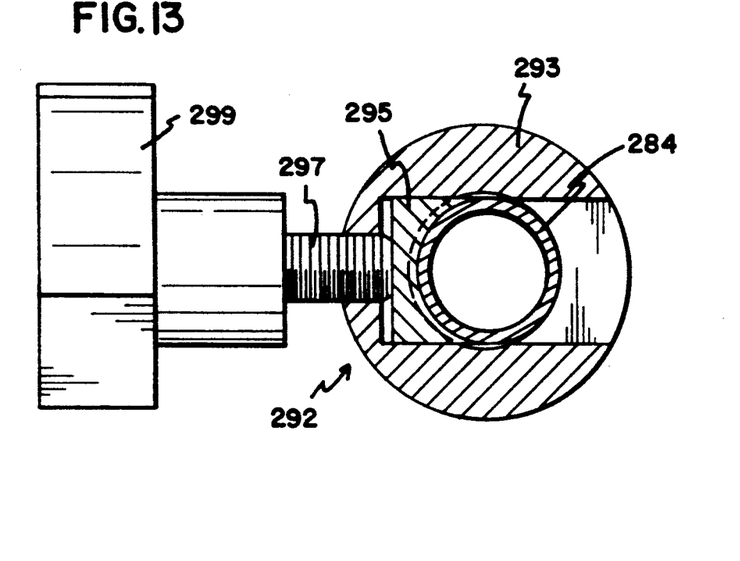
FIG. 13 is a cross-sectional view of the preferred interlocking hardware of the second embodiment.

The locking hardware 292 of the second preferred embodiment is shown in FIG. 13. As with the first embodiment, the second interlocking tube 284 slides telescopically within the first interlocking tube 282. A bushing 283 (FIG. 12) attached to tube 284 fits snugly with the tube 282 so that the tubes slide smoothly.

The locking hardware 292 preferably includes a collar 293 which is attached to the first tube 282, such as by threads. A transverse bore 291 extends into the collar 293. Located at the base of the transverse bore is a clutch plate 295. The clutch plate has a curved inner surface and a flat outer surface. The inner surface conforms to the curvature of the second interlocking tube 284. A locking member 297, which is preferably threaded through the collar 293, presses against the outer surface of the clutch plate. The locking member has a handle 299.

According to this arrangement, when the locking member is retracted from the collar 293, interlocking tube 284 is free to rotate and to move telescopically relative to interlocking tube 282. Once the tubes are in the correct relative position, the tubes can be locked together by rotating the handle, causing the clutch plate 295 to press tube 284 against the wall of the collar 293.

The third interlocking tube 286 is preferably square in cross-section. The purpose of the square tube is to prevent tube 286 from rotating relative to tube 284. Locking hardware 298 is preferably identical to that shown in FIG. 13, except that the collar has a square interior cross-section, and contains a clutch plate which is planar on both surfaces (so as to accommodate the square interlocking tube).

Figure 14:
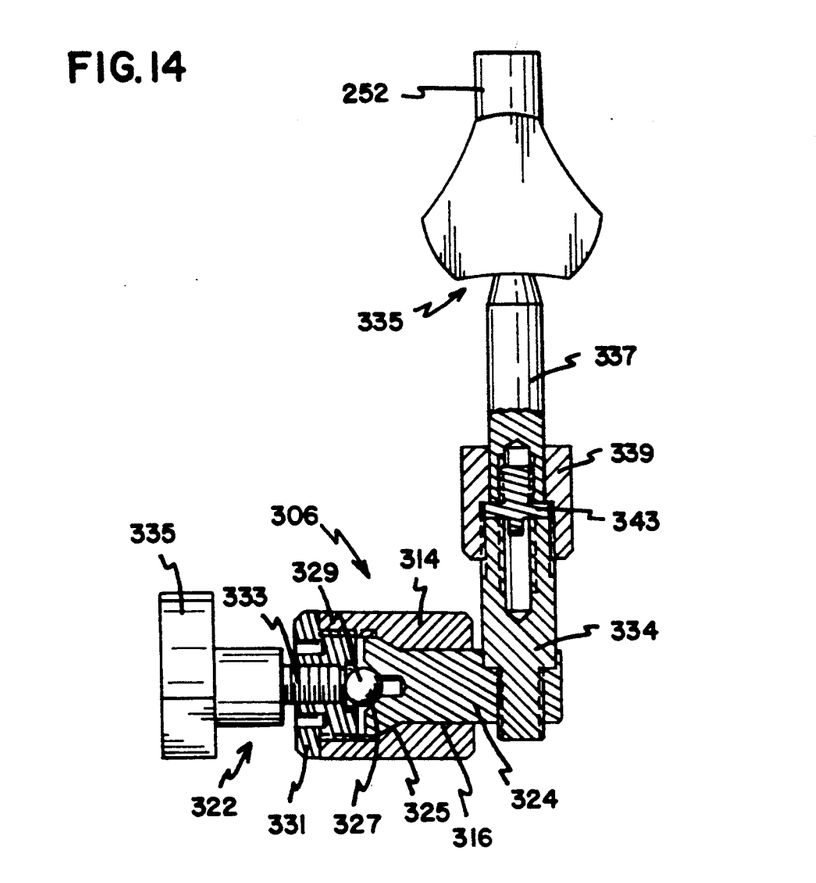
FIG. 14 is a cross-sectional view of the preferred swing joint of the second embodiment.

The swing joint 306 of the second preferred embodiment is shown in FIG. 14. As seen therein, the swing joint has a housing 314 preferably rigidly attached to the end of interlocking member 286. The housing has a longitudinal cavity 316 extending therethrough. The longitudinal cavity has a wide portion and a narrower portion, with a tapered wall in between. A pivot rod 324 is located within the cavity 316, and has a shoulder portion 325 which contacts the tapered wall of the cavity. A cover 331 is attached to the housing, preferably by means of threads.

A locking apparatus 322 is provided to lock the pivot rod 324 relative to the housing 314. The locking apparatus preferably includes a ball bearing 329 which rests in depression 327 formed in the upper surface of the pivot rod 324. An adjustment member 333 is threadably engaged with an opening located in cover 331. A handle 335 is attached to the adjustment member. Rotation of the handle causes the adjustment member to apply downward pressure via a ball bearing 329 on the rod 324. The resultant increase in friction between the shoulder of rod 324 and the housing 314 locks the swing joint in the desired position.

A post 334 is attached to the pivot rod 324. In order to provide additional adjustability, the system of the second preferred embodiment employs a second lockable positioning apparatus 335. This positioning apparatus is preferably identical to the positioning apparatus 254 shown in FIG. 12, although of slightly smaller dimensions, and is essentially a ball joint. The ball (not shown) of the ball joint is connected to arm 337. A rotatable collar 339 having internal threads is used to connect arm 337 to post 334. The collar preferably has a knurled outer surface. A retaining screw 343 is preferably threaded onto the end of arm 337 and retains the collar 339.

Attached to the housing 341 of positioning apparatus 335 is securing apparatus 252, which, like that of the first preferred embodiment, is designed to engage whatever apparatus is being held by the mounting system.

The configuration of the second preferred embodiment shown in FIG. 11 is particularly useful for holding an actuating switch on a wheelchair. The adjustability provided by positioning apparatuses 254 and 335, telescoping expandable arm 212, and swing joint 316 allow the system to hold an actuating switch in any desired position relative to the occupant of the wheelchair.

The system of the second preferred embodiment also provides for removal of the expandable arm 212 and swing joint 316 for use in a more compact configuration. In order to do so, the collar 249 located at end 246 of expandable arm 212 is rotated so as to disconnect the arm from the mounting apparatus 250. The collar 339 attached to arm 337 is also rotated so as to disconnect the positioning apparatus 335 from the swing joint 306. Positioning apparatus 335 can then be connected to mounting apparatus 250 by threading collar 239 onto the smaller fitting 255. In this alternative configuration, a great deal of flexibility is still provided by the two lockable positioning apparatuses 254 and 335.

The system of the second preferred embodiment may be used with the supporting clamp 216 shown in FIG. 11. This supporting clamp has an upper jaw 217 and a lower jaw 219 which are pivotably joined together. An adjusting screw 221 is provided for clamping and unclamping the jaws.

When using the supporting clamp 216 shown in FIG. 11, the base member 214 preferably has the configuration shown in FIG. 12. As seen therein, the post has a reduced portion 225 with flattened opposing sides, and a transversely-positioned pin 227. An opening 223 in the supporting clamp is configured to receive the base member. The pin 227 engages the side walls of opening 223 to prevent the base member from rotating relative to the supporting clamp. A retaining pin 224 extends transversely through the supporting clamp. The retaining pin 224 can be pressed in to allow the base member to be inserted. Upon release of the retaining pin, it is biased to a position whereby it engages the reduced portion 225 of the base member. A locking member 226 is further provided on the supporting clamp. The locking member 226 can be rotated so as to press against a flattened side of reduced portion 225 so as to securely hold the base member on the supporting clamp.

The present system provides a high degree of flexibility for holding devices in virtually any desired position through the combined use of the integrated subsystem components described in the present application. Those skilled in the art will recognize that many variations in the size, shape and other details of the subsystem components are possible and desirable. In this regard, the present invention is to be limited only in accordance with the scope of the appended claims, since others skilled in the art may devise other embodiments still within the limits of the claims.

What is claimed is:

1. An adjustable mounting system for holding a device in a particular position, the system comprising:
   (a) support means comprising a base member for coupling the system to a rigid support structure;
   (b) an expandable arm comprising adjustment means for adjusting the length of the expandable arm anywhere between fully extended and fully shortened positions, the expandable arm having first and second ends;
   (c) locking positioning means coupled between the first end of the expandable arm and the base member for positioning and locking the arm so that the device can be held proximate the first end of the arm anywhere within first and second hemispheres, the first hemisphere being defined by the length of the expandable arm when the arm is fully extended and the second hemisphere being defined by the length of the arm expandable arm when the arm is fully shortened; and
   (d) securing means coupled between the second end of the expandable arm and the device to be held for securing the device to be held proximate the second end of the expandable arm, said securing means comprising a locking swing joint which has 360 degrees of freedom and which can be locked in any position to which it can be oriented, said locking swing joint comprising:
      (i) a swing joint housing attached to the expandable arm, said swing joint housing having a central longitudinal axis and defining a longitudinal cavity oriented along at least a portion of its central longitudinal axis;
      (ii) a cover attached to said swing joint housing;
      (iii) a rod-shaped member that fits within the longitudinal cavity defined by the swing joint housing, the longitudinal cavity defined by the swing joint housing and the rod-shaped member each comprising a portion having a matching tapered configuration; and
      (iv) swing joint locking means for biasing the tapered portion of the rod-shaped member toward the tapered portion of the longitudinal cavity, said swing joint locking means comprising an adjustment member extending through said cover, said adjustment member being movable so as to bias the tapered portion of the rod-shaped member toward the tapered portion of the longitudinal cavity.

2. The adjustable mounting system of claim 1 wherein the lockable position means comprises a lockable ball joint, the lockable ball joint comprising:
   (a) a ball portion comprising a substantially spherical ball, the ball being rigidly secured to the base member;
   (b) a ball joint housing formed as part of the support means and at least partially surrounding the ball and at least part of the base member, the ball joint housing defining a cavity bounded in part by an inner housing wall having a slidable slip fit over the ball;
   (c) the ball joint housing being configured around the at least portion of the ball and the at least part of the base member so that it may be positioned to any radial orientation within the first and second hemispheres; and
   (d) locking means for locking the ball joint housing into position at any orientation to which the ball joint housing can be positioned.

3. The adjustable mounting system of claim 2 wherein the locking means comprises:
   (a) a clutch plate within the housing; and
   (b) adjustment means for adjustably positioning the clutch plate so that it can be selectively biased into or away from the ball.

4. The adjustable mounting system of claim 3 wherein said clutch plate has a depression formed in an upper surface thereof, and wherein said adjustment means comprises an adjustment member and a ball bearing disposed in said depression between the clutch plate and said adjustment member.

5. The adjustable mounting system of claim 3 wherein:
   (a) the cavity is defined by the housing such that it comprises a closable opening at one surface of the housing, the closable opening being of sufficient size so that the ball and the clutch plate can be positioned within the housing cavity through the opening;
   (b) the housing comprises a cover which can be removably fixed into the opening; and
   (c) the adjustment means comprises an adjustment member which passes through the cover and abuts the clutch plate for adjusting the bias of the clutch plate into or away from the ball.

6. The adjustable mounting system of claim 5 wherein the adjustment member comprises a threaded portion which cooperates with a threaded portion of the cover so that the bias of the clutch plate into or away from the ball can be selected by adjusting the rotational position of the adjustment member.

7. The adjustable mounting system of claim 1 wherein the expandable arm comprises first and second interlocking members, the second interlocking member having an outside diameter, the first interlocking member comprising a first tube having an inside diameter which forms a slidable slip fit with the outside diameter of the second interlocking member, the first end of the second interlocking member being positioned and sliding axially and rotatably into the second end of the first interlocking tube, the first end of the first interlocking tube being coupled to the lockable positioning means the second end of the first interlocking tube comprising first tube locking means for locking the second interlocking member at any desired axial and rotational position within the first tube, the second end of the second interlocking member being coupled to the securing means for securing the device to be held proximate the second end of the arm.

8. The adjustable mounting system of claim 7 wherein the first tube locking means comprises a first split ring located at the second end of the first interlocking tube, the first split ring having an internal diameter surrounding the outside diameter of the second interlocking tube, the first split ring further having adjustment means for adjusting its internal diameter in order to adjustably bias the internal diameter of the first split ring around the outside diameter of the second interlocking member.

9. The adjustable mounting system of claim 7 wherein the first tube locking means comprises:
   (a) a collar located at the second end of the first interlocking tube, said collar having an opening through which said second interconnecting member extends,
   (b) a clutch plate disposed within said collar, and
   (c) a locking member which adjustably biases the clutch plate so that the clutch plate presses the second interconnecting member against the collar.

10. The adjustable mounting system of claim 7 wherein the securing means is coupled to the second end of the second interlocking member by a third interlocking member, the third interlocking member having an outside diameter, the second interlocking member comprising a second tube having an inside diameter which forms a slidable slip flit with the outside diameter of the third interlocking member, the first end of the third interlocking member being positioned and sliding axially and rotatably into the second end of the second interlocking tube, the second end of the second interlocking tube comprising second tube locking means for locking the third interlocking member at any desired axial and rotational position within the second tube, the second end of the third interlocking member being coupled to the securing means for securing the device to be held proximate the second end of the arm.

11. The adjustable mounting system of claim 10 wherein the second tube locking means comprises a second split ring located at the second end of the second interlocking tube, the second split ring having an internal diameter surrounding the outside diameter of the third interlocking member, the second split ring further having adjustment means for adjusting its internal diameter in order to adjustably bias the internal diameter of the second split ring around the outside diameter of the third interlocking member.

12. The adjustable mounting system of claim 11 wherein the first and second split ring adjustment means each comprise a threaded mechanism for adjusting its internal diameter.

13. The adjustable mounting system of claim 10 wherein the second tube locking means comprises:
   (a) a collar locked at the second end of the second interlocking tube, said collar having an opening through which said third interconnecting member extends,
   (b) a clutch plate disposed within said collar, and
   (c) a locking member which adjustably biases the clutch plate so that the clutch plate presses the third interconnecting member against the collar.

14. The adjustable mounting system of claim 10 wherein said third interconnecting member is generally square in transverse cross-section.

15. The adjustable mounting system of claim 1 wherein the central longitudinal axis of the swing joint housing is oriented in a plane which is substantially perpendicular to the length of the expandable arm.

16. The adjustable mounting system of claim 15 wherein the locking swing joint further comprises an elongated mounting member attached to the rod-shaped member, and wherein the elongated mounting member swings 360 degrees in a plane that is parallel to the length of the expandable arm.

17. The adjustable mounting system of claim 16, wherein the elongated mounting member defines a tapped hole in an outer end thereof, said tapped hole serving as an attachment means for securing the device to be held proximate the second end of the expandable arm.

18. The adjustable mounting system of claim 1 further comprising mounting means for mounting the expandable arm to the lockable positioning means.

19. The adjustable mounting system of claim 18 wherein the mounting means comprises a protrusion attached to the lockable positioning means which cooperates with the expandable arm, and a set screw for attaching the expandable arm to the protrusion.

20. The adjustable mounting system of claim 18 wherein the mounting means comprises a threaded fitting attached to the lockable positioning means, and a threaded collar rotatably attached to the expandable arm which cooperates with the threaded fitting so as to attach the expandable arm to the lockable positioning means.

21. The adjustable mounting system of claim 1 wherein rod-shaped member has a depression formed in an upper surface thereof, said swing joint locking means further comprising a ball bearing disposed in said depression between the rod-shaped member and said adjustment member.

22. The adjustable mounting system as claimed in claim 1 wherein said lockable positioning means is a first lockable positioning means and wherein said securing means further comprises a second lockable positioning means attached to said locking swing joint which can be positioned at various radial orientations relative to said locking swing joint.

23. The adjustable mounting system as claimed in claim 22, wherein said second lockable positioning means comprises a lockable ball joint.

24. The adjustable mounting system as claimed in claim 23, wherein said lockable ball joint comprises a ball housing, a ball disposed within said ball housing and attached to said locking swing joint, and an elongated mounting member for mounting the device to be held proximate the second end of the expandable arm attached to said ball housing.

* * * * *